(12) United States Patent
Nakaseko

(10) Patent No.: US 8,804,019 B2
(45) Date of Patent: Aug. 12, 2014

(54) SOLID-STATE IMAGING DEVICE, METHOD OF DRIVING THE SAME, AND CAMERA SYSTEM

(75) Inventor: Tetsuji Nakaseko, Fukuoka (JP)

(73) Assignee: Sony Corporation, Tokyo (JP)

( * ) Notice: Subject to any disclaimer, the term of this patent is extended or adjusted under 35 U.S.C. 154(b) by 310 days.

(21) Appl. No.: 13/448,845

(22) Filed: Apr. 17, 2012

(65) Prior Publication Data

US 2012/0307119 A1    Dec. 6, 2012

(30) Foreign Application Priority Data

May 30, 2011    (JP) ................................ 2011-120083

(51) Int. Cl.
*H04N 5/347*    (2011.01)

(52) U.S. Cl.
USPC ......................................................... 348/302

(58) Field of Classification Search
CPC ....................................................... H04N 5/347
USPC ......................................................... 348/302
See application file for complete search history.

(56) References Cited

U.S. PATENT DOCUMENTS

| 8,184,172 B2 * | 5/2012 | Nakaseko | 348/220.1 |
| 2009/0219428 A1 * | 9/2009 | Nakano et al. | 348/308 |
| 2011/0298954 A1 * | 12/2011 | Nakaseko | 348/296 |

\* cited by examiner

*Primary Examiner* — Gary C Vieaux
(74) *Attorney, Agent, or Firm* — Rader, Fishman & Grauer PLLC

(57) ABSTRACT

A solid-state imaging device includes: a pixel section in which a plurality of pixels including a photoelectric conversion element are arranged in a matrix; a pixel driving section that drives the pixels in a row unit so as to read out a pixel signal from the pixel section; a column processing section that performs a column process, synchronized with a first clock of a first frequency previously selected, on the pixel signal read out by driving of the pixel driving section; and a rate conversion control section that performs a rate conversion control of data processed in the column processing section in accordance with rate conversion information. The rate conversion control section includes a first rate converter, a second rate converter, a data rate conversion section, and a data output section.

15 Claims, 9 Drawing Sheets

110A

SOLID-STATE IMAGING DEVICE, METHOD OF DRIVING THE SAME, AND CAMERA SYSTEM

FIELD

The present disclosure relates to a solid-state imaging device, a method of driving the same, and a camera system.

BACKGROUND

CMOS (Complementary Metal Oxide Semiconductor) image sensors (CIS) have features capable of setting readout addresses relatively freely with respect to a CCD (Charge Coupled Device) image sensor.

For example, image sensors are widely used which include functions such as "addition" for simultaneously reading out a signal of a plurality of pixels, "decimation" for intermittently reading out the signal while skipping rows or columns, and "excision" for reading out the signal only from a portion of the pixels, in addition to readout of all the pixels of the sensor.

"Addition", "decimation", and "excision" may be simultaneously performed.

Image sensors can convert data by decimating or adding data at the time of outputting image data.

FIG. 1 is a diagram illustrating a configuration example of a general CMOS image sensor (solid-state imaging device).

A CMOS image sensor 10 of FIG. 1 includes a pixel array section 11, a row scanning circuit 12, a column processing section (readout circuit) 13, a column scanning circuit 14, a timing control circuit 15, and an output interface (IF) circuit 16.

The pixel array section 11 is arranged in a two-dimensional shape (matrix) in which a plurality of pixel circuits 11A-00 to 11A-st have s rows×t columns.

In the CMOS image sensor 10 of FIG. 1, the row scanning circuit 12 drives pixels through a column scanning control line in shutter rows and readout rows depending on controls of a shutter control section and a readout control section of the timing control circuit 15.

The column processing section (readout circuit) 13 reads a signal vsl output to an output signal line lsgn, outputs the read signal to a transfer line ltrf in accordance with column scanning of the column scanning circuit 14, and outputs the signal to the outside using the output IF circuit 16.

In the example of FIG. 1, the column processing section (readout circuit) 13 is constituted by column ADC sections in which an AD converter (ADC: Analog-to-Digital Converter) 13-1 is disposed for each column.

The column ADC section performs A/D conversion in a column unit, outputs the read signal to the transfer line ltrf in accordance with scanning of data after A/D conversion by the column scanning circuit 14, and outputs the signal to the outside using the output IF circuit 16.

FIG. 2 is a block diagram illustrating a configuration example of a data conversion control section including an output system of image data subsequent to the column processing section of the CMOS image sensor of FIG. 1.

A data conversion control section 20 of FIG. 2 includes the output IF circuit 16, a line buffer 17, a reference clock rate converter 18, and a data output section 19.

In this manner, the CMOS image sensor 10 of FIG. 2 performs a rate conversion on data after an A/D conversion process of the column processing section 13 by using the line buffer 17.

Meanwhile, the line buffer 17 is formed by FIFO, SRAM or the like.

SUMMARY

As mentioned above, the image sensor is able to convert a data rate by decimating or adding data at the time of outputting image data.

A buffer (such as a memory) that temporarily stores data is not necessary in a conversion of which the rate conversion ratio is $1/2^n$ (1/2, 1/4, 1/8, ... ), but a buffer that temporarily stores data is necessary in other data rate conversions.

A line buffer such as FIFO or SRAM has a large area and power consumption, and leads to an increase in the circuit size or power consumption.

In a camera system of a current cellular phone, digital scaling (free reduction of m/n) on the image sensor side is required, while low power consumption and a small image sensor are required.

It is therefore desirable to provide a solid-state imaging device, a method of driving the same, and a camera system, capable of achieving the small circuit size and low power consumption, in which a buffer is not necessary for a rate conversion.

An embodiment of the present disclosure is directed to a solid-state imaging device including: a pixel section in which a plurality of pixels including a photoelectric conversion element are arranged in a matrix; a pixel driving section that drives the pixels in a row unit so as to read out a pixel signal from the pixel section; a column processing section that performs a column process, synchronized with a first clock of a first frequency previously selected, on the pixel signal read out by driving of the pixel driving section; and a rate conversion control section that performs a rate conversion control of data processed in the column processing section in accordance with rate conversion information, wherein the rate conversion control section includes a first rate converter that generates the first clock and supplies the first clock to the column processing section, on the basis of a reference clock which is a second clock of a second frequency, a second rate converter that generates a third clock of a third frequency which changes depending on a data rate, on the basis of the reference clock which is the second clock of the second frequency, a data rate conversion section that converts a rate of data processed in the column processing section through a process including an addition process, and outputs data after the conversion or before the conversion as second data, and a data output section that outputs the second data which is output from the data rate conversion section, in synchronization with the third clock.

Another embodiment of the present disclosure is directed to a method of driving a solid-state imaging device, including: reading out a pixel signal from a pixel section in which a plurality of pixels including a photoelectric conversion element are arranged in a matrix; performing a column process, synchronized with a first clock of a first frequency previously selected, on the pixel signal read out by the reading out; and performing a rate conversion control of data processed in the performing of a column process, in accordance with rate conversion information, wherein the performing a rate conversion control includes generating the first clock and supplying the generated first clock to the performing a column process, on the basis of a reference clock which is a second clock of a second frequency, generating a third clock of a third frequency which changes depending on a data rate, on the basis of the reference clock which is the second clock of the second frequency, converting a rate of data processed in the performing of a column process through a process including an addition process, and outputting data after the conversion or before the conversion as second data, and outputting the second data which is converted by the converting a rate of data, in synchronization with the third clock.

Still another embodiment of the present disclosure is directed to a camera system including: a solid-state imaging device; an optical system that forms a subject image in the solid-state imaging device; and a signal processing circuit that processes an output image signal of the solid-state imaging device, wherein the solid-state imaging device includes a pixel section in which a plurality of pixels including a photoelectric conversion element are arranged in a matrix; a pixel driving section that drives the pixels in a row unit so as to read out a pixel signal from the pixel section; a column processing section that performs a column process, synchronized with a first clock of a first frequency previously selected, on the pixel signal read out by driving of the pixel driving section; and a rate conversion control section that performs a rate conversion control of data processed in the column processing section in accordance with rate conversion information, and the rate conversion control section includes a first rate converter that generates the first clock and supplies the first clock to the column processing section, on the basis of a reference clock which is a second clock of a second frequency, a second rate converter that generates a third clock of a third frequency which changes depending on a data rate, on the basis of the reference clock which is the second clock of the second frequency, a data rate conversion section that converts a rate of data processed in the column processing section through a process including an addition process, and outputs data after the conversion or before the conversion as second data, and a data output section that outputs the second data which is output from the data rate conversion section, in synchronization with the third clock.

According to the embodiments of the present disclosure, a buffer is not necessary for a rate conversion, and it is possible to achieve the small circuit size and low power consumption.

DETAILED DESCRIPTION

Hereinafter, embodiments of the present disclosure will be described with reference to the drawings.

The description will be made in the following order.
1. First Embodiment (configuration example of a CMOS image sensor (solid-state imaging device))
2. Second Embodiment (configuration example of a camera system)
<1. First Embodiment>

Figure 3:
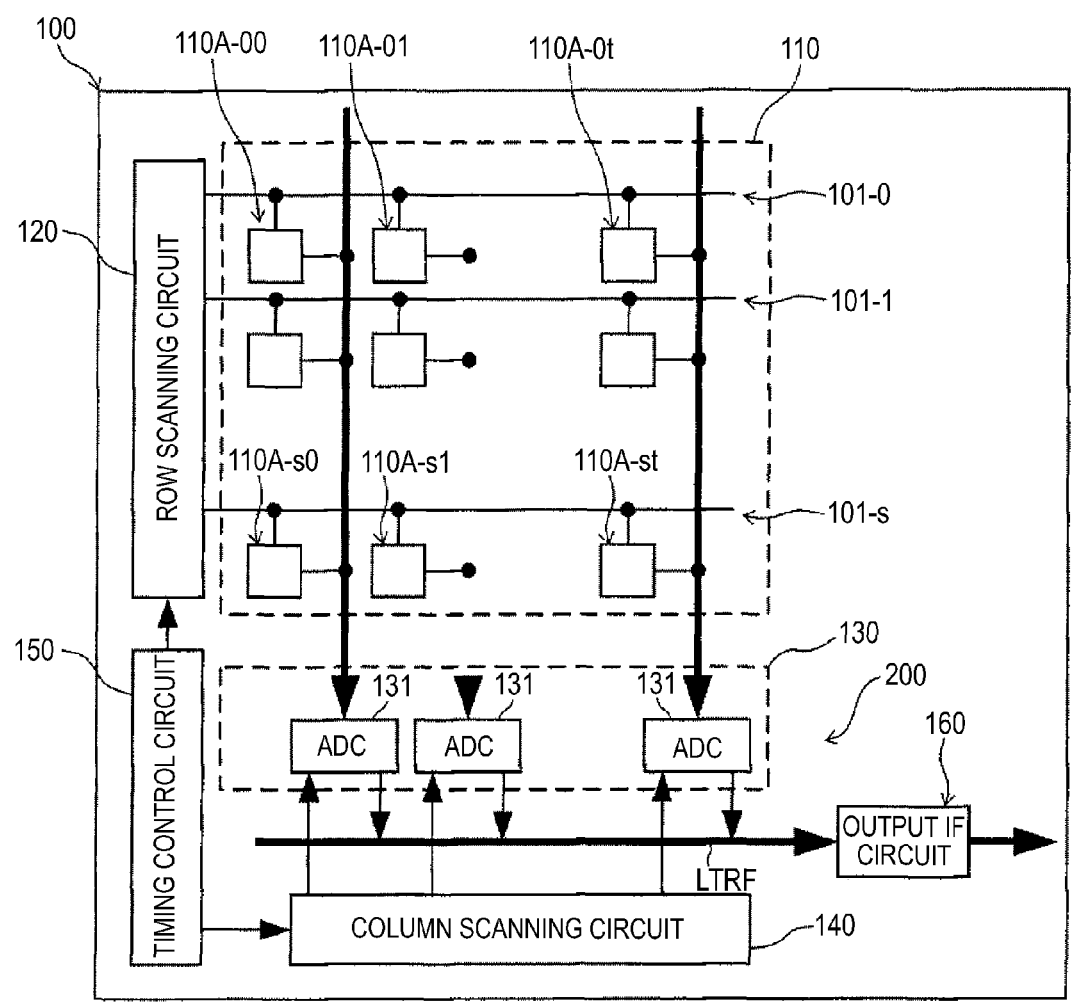
FIG. 3 is a diagram illustrating a configuration example of the CMOS image sensor (solid-state imaging device) according to a first embodiment of the present disclosure.

FIG. 3 is a diagram illustrating a configuration example of a CMOS image sensor (solid-state imaging device) according to a first embodiment of the present disclosure.

A CMOS image sensor 100 includes a pixel array section 110, a row scanning circuit 120, a column processing section (readout circuit) 130, a column scanning circuit 140, a timing control circuit 150, and an output interface (IF) circuit 160.

Meanwhile, a rate conversion control section 200 is configured, including the column scanning circuit 140, the timing control circuit 150, and the output IF circuit 160.

The rate conversion control section 200 in the present embodiment supplies a first clock CLKs of a first frequency f1 previously selected to the column processing section 130 so that the column processing section (readout circuit) 130 operates at a constant timing.

The column processing section 130 is configured as, for example, a column ADC section in which an AD converter (ADC: Analog-to-Digital Converter) 131 is disposed for each column.

In the embodiment of the present disclosure, it is important not to change the time of an ADC control. Since the system of a current column ADC is a time to digital converter scheme, a change of the control timing leads to complication of a circuit control and a considerable increase in costs.

For this reason, in the embodiment of the present disclosure, the data rate conversion (change) is realized by the rate conversion (change) of a drive clock and the addition of data, without changing the timing of the ADC control, and without using a buffer.

According to the embodiment of the present disclosure, the system can be simplified and costs can be considerably reduced. Further, a buffer (line memory) is not necessary, and a control circuit for an ADC parameter change due to a change of the clock rate is not necessary.

The rate conversion control section 200 basically includes the following configuration in order to realize such a configuration.

The rate conversion control section 200 has a function of performing a rate conversion control of data processed in the column processing section 130, in accordance with rate conversion information such as decimation or addition.

The rate conversion control section 200 generates the first clock CLKs and supplies the clock to the column processing section 130, on the basis of a reference clock CLKd which is a second clock of a second frequency f2.

The rate conversion control section 200 generates a third clock CLKo of a third frequency f3 which changes depending on a data rate, on the basis of the reference clock CLKd which is the second clock of the second frequency f2.

The rate conversion control section 200 includes a data rate conversion section that converts a rate of first data D1 processed in the column processing section 130 through a process including an addition process and an averaging process and outputs data after the conversion or before the conversion as second data D2. The data rate conversion section is included in the output IF circuit 160.

The rate conversion control section 200 outputs the second data D2, which is output by the data rate conversion section, from the output IF circuit 160, in synchronization with the third clock CLKo.

When the rate conversion ratio is n/m, the rate conversion control section 200 sets the frequency f2 of the second clock which is the reference clock CLKd to $f1/(m/n^2)$, and sets the third frequency f3 of the third clock CLKo to f2/n.

The rate conversion control section 200 includes a phase-locked loop (PLL) that outputs a fourth clock CLKp of a fourth frequency f4 which is phase-synchronized with the reference clock CLKd, and frequency-divides the fourth clock CLKp which is output by the PLL to generate the reference clock CLKd of the second frequency f2.

The fourth frequency f4 of the fourth clock CLKp is p times the second frequency f2 of the reference clock CLKd, and is (p·n) times the third frequency f3 of the third clock CLKo.

The configuration and the function of the rate conversion control section 200 will be described later in detail.

The pixel array section 110 is arranged in a two-dimensional shape (matrix) in which a plurality of pixel circuits 110A-00 to 110A-st have s rows×t columns.

Figure 4:
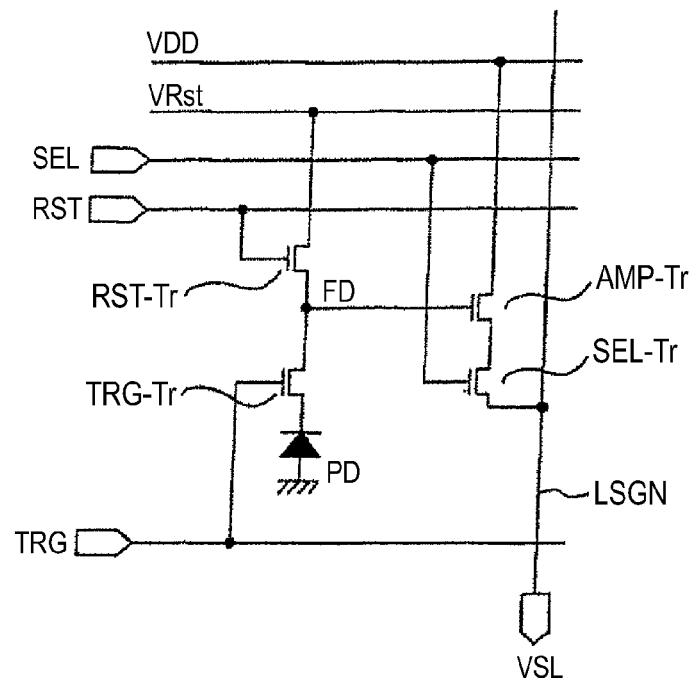
FIG. 4 is a diagram illustrating an example of a pixel circuit according to the present embodiment.

FIG. 4 is a circuit diagram illustrating an example of a pixel circuit according to the present embodiment.

The pixel circuit 110A (00 to st) includes a photoelectric conversion element (hereinafter, sometimes simply referred to as a PD) made of, for example, photodiodes (PD).

One photoelectric conversion element PD includes a transfer transistor TRG-Tr, a reset transistor RST-Tr, an amplification transistor AMP-Tr, and a selection transistor SEL-Tr, one by one.

The photoelectric conversion element PD generates and accumulates signal charges (herein, electrons) having an amount based on the amount of incident light.

Hereinafter, a case where the signal charge is an electron and each of the transistors is an N-type transistor will be described, but the signal charge may be a hole, or each of the transistors may be a P-type transistor.

In addition, the present embodiment is also effective in a case where each of the transistors is shared between a plurality of photoelectric conversion elements, or a case where a 3-transistor (3Tr) pixel which does not have a selection transistor is adopted.

The transfer transistor TRG-Tr is connected between the photoelectric conversion element PD and FD (Floating Diffusion), and is controlled through a control line TRG.

The transfer transistor TRG-Tr is selected in a period of time for which the control line TRG is in a high level (H) and is in a conduction state, and transfers electrons photoelectrically converted in the photoelectric conversion element PD to the FD.

The reset transistor RST-Tr is connected between a power supply line VRst and the FD, and is controlled through a control line RST.

The reset transistor RST-Tr is selected in a period of time for which the control line RST is in a H level and is in a conduction state, and resets the FD to a potential of the power supply line VRst.

The amplification transistor AMP-Tr and the selection transistor SEL-Tr are connected in series between a power supply line VDD and an output signal line LSGN.

The FD is connected to a gate of the amplification transistor AMP-Tr, and the selection transistor SEL-Tr is controlled through a control line SEL.

The selection transistor SEL-Tr is selected in a period of time for which the control line SEL is in a H level and is is a conduction state. Therefore, the amplification transistor AMP-Tr outputs a signal VSL based on of a potential of the FD to the output signal line LSGN.

In the pixel array section 110, since the pixel circuit 110A is disposed in s rows×t columns, the number of each of the control lines SEL, RST, and TRG is s, and the number of the output signal lines LSGN of the signal VSL is t.

Figure 1:
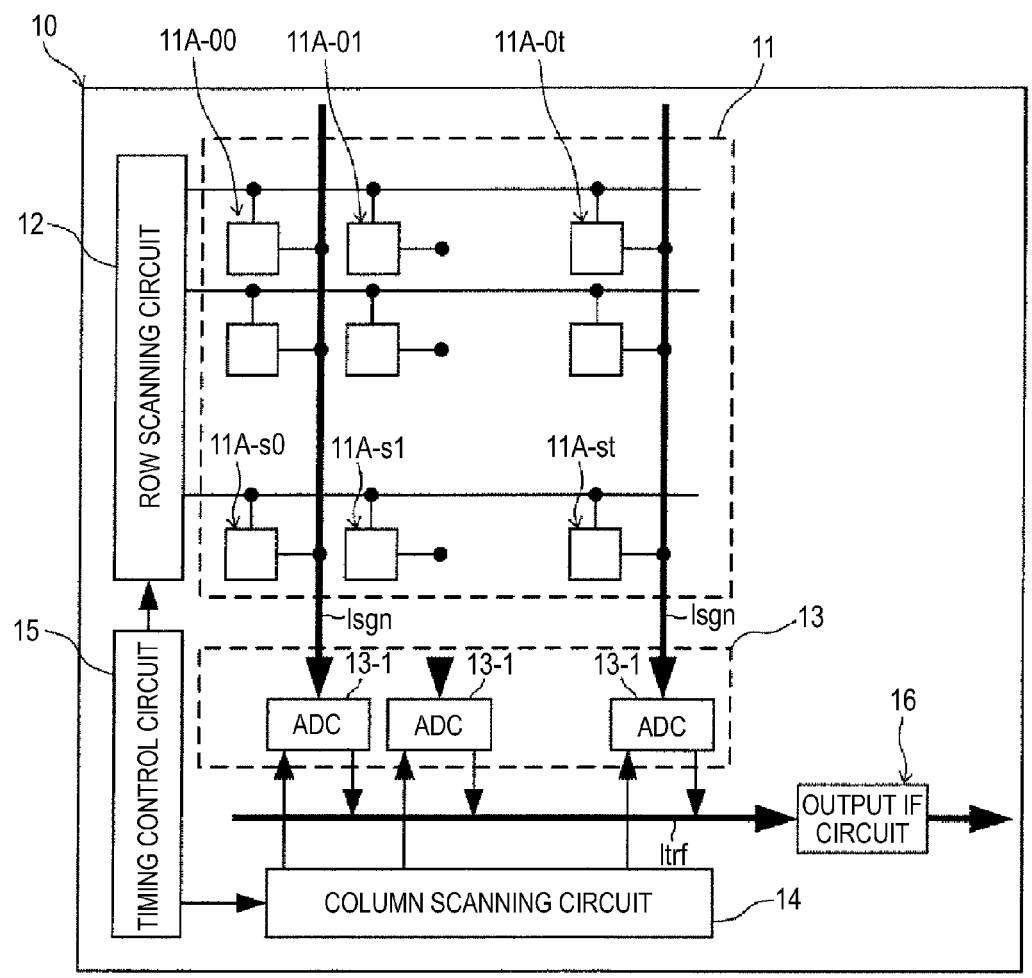
FIG. 1 is a diagram illustrating a configuration example of a general CMOS image sensor (solid-state imaging device).
Figure 2:
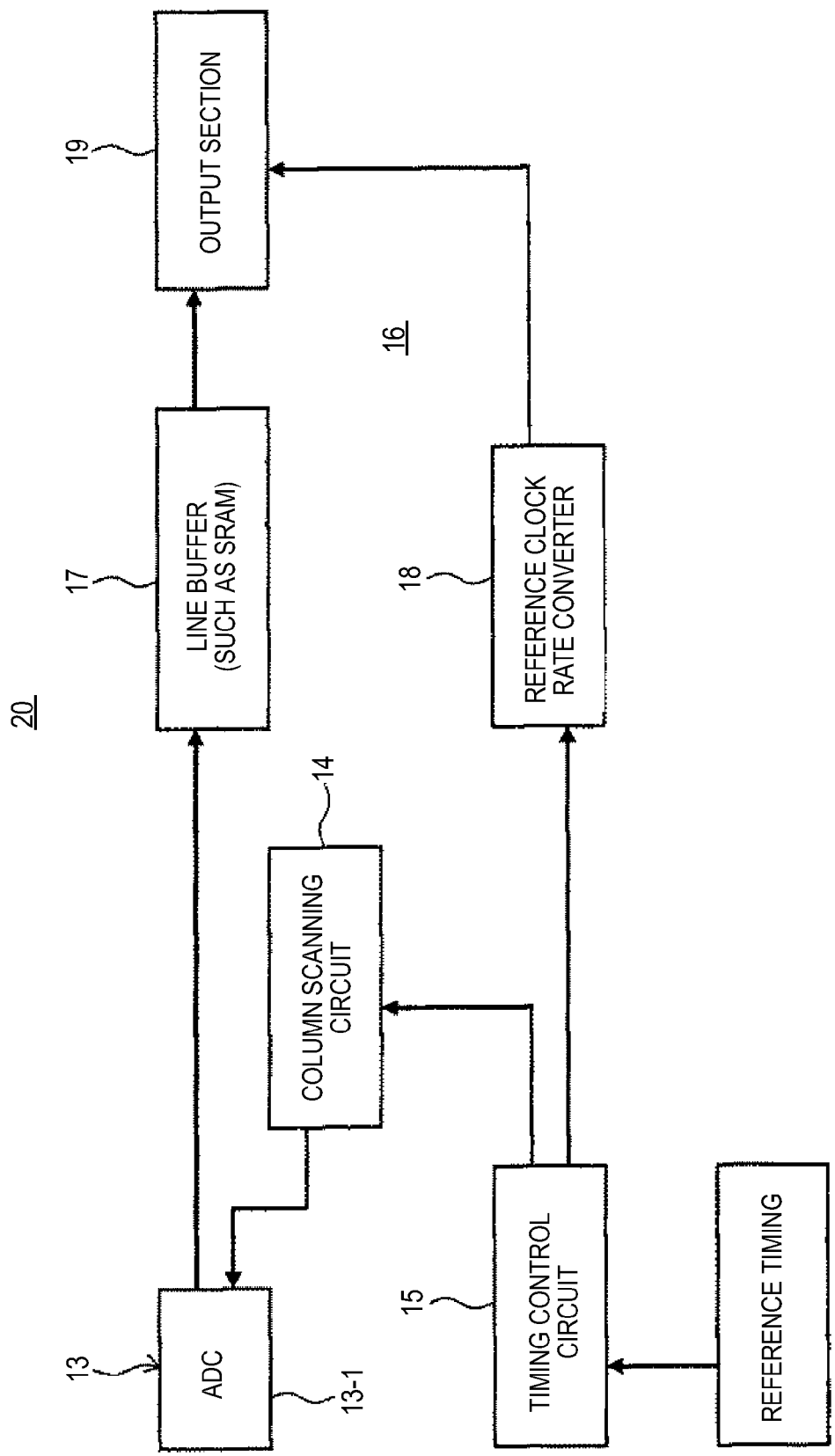
FIG. 2 is a block diagram illustrating a configuration example of a data conversion control section including an output system of image data subsequent to a column processing section of the CMOS image sensor of FIG. 1.

In FIG. 2, each of the control lines SEL, RST, and TRG is expressed as one of the column scanning control lines 101-0 to 101-s.

The row scanning circuit 120 drives pixels through the column scanning control lines in shutter rows and readout rows depending on controls of a shutter control section and a readout control section of the timing control circuit 150.

The row scanning circuit 120 outputs row selection signals RD and SHR of row addresses of a reading row for reading out a signal and a shutter row for performing a reset by spiting out charges accumulated in the photoelectric conversion element PD, in accordance with an address signal.

The column processing section 130 reads the signal VSL output to the output signal line LSGN in accordance with a control signal from a sensor controller which is not shown, outputs the read signal to the transfer line LTRF in accordance with column scanning of the column scanning circuit 140, and outputs the signal to the outside using the output IF circuit 160.

The column processing section 130 performs a predetermined process on the signal VSL which is output through the output signal line LSGN from each pixel circuit 110A of the readout row selected by driving of the row scanning circuit 120, and, for example, temporarily holds a pixel signal after signal processing.

A circuit configuration including a sample-and-hold circuit that samples and holds a signal which is output from, for example, the output signal line LSGN can be applied to the column processing section 130.

Alternatively, the column processing section 130 includes a sample-and-hold circuit, and a circuit configuration including a function of removing fixed pattern noise specific to a pixel, such as reset noise and threshold variation of an amplification transistor, through a CDS (correlation double sampling) process can be applied thereto.

In addition, a configuration, having an analog-to-digital (AD) conversion function, in which a signal level is set to a digital signal can be applied to the column processing section 130.

In the example of FIG. 3, the column processing section 130 is configured as a column ADC section in which the AD converter (ADC: Analog Digital Converter) 131 is disposed for each column.

The column ADC section performs an A/D conversion in a column unit, outputs a read signal to the transfer line LTRF in accordance with scanning of data after the A/D conversion by the column scanning circuit 140, and outputs the signal to the outside using the output IF circuit 160.

Figure 5:
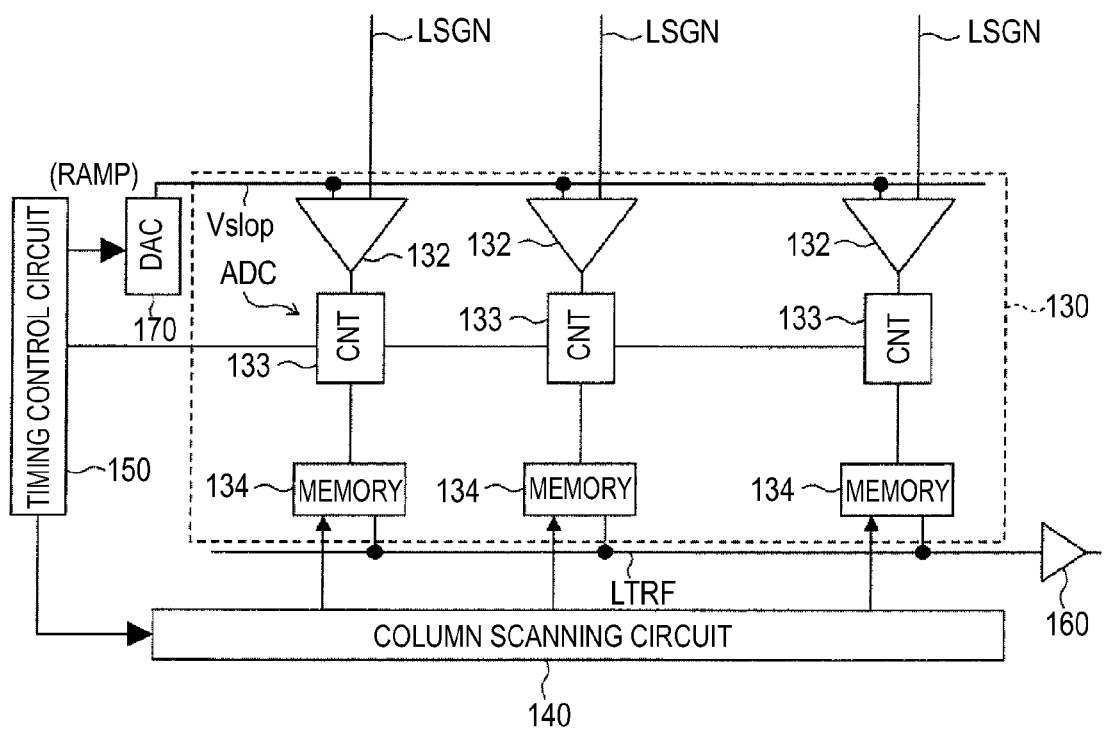
FIG. 5 is a diagram illustrating a configuration example of a column ADC section according to the present embodiment.

FIG. 5 is a diagram illustrating a configuration example of the column ADC section according to the present embodiment.

Each of the ADCs 131 includes a comparator 132 that compares a reference voltage Vslop which is a ramp waveform (RAMP) obtained by changing a reference voltage generated by a DAC 170 in a stepwise shape with the analog signal VSL obtained through the output signal line LSGN from the pixel for each row.

Each of the ADCs 131 includes a counter 133 that counts the comparison time of the comparator 132, and a memory (latch) 134 that holds a count result of the counter 133.

The column processing section 130 has a multi-bit, for example, 10-bit digital signal conversion function, is disposed for each output signal line (vertical signal line) LSGN, and is constituted by column-parallel ADC blocks.

The output of each latch 134 is connected to the transfer line LTRF having a multi-bit width.

In the column processing section 130, the signals VSL read out to the output signal line LSGN are compared by comparator 132 disposed for each column.

At this time, the counter 133 disposed for each column operates similarly to the comparator 132, and the reference voltage Vslop which is a ramp waveform and the count value are changed while corresponding one-to-one, whereby an analog signal potential VSL of the output signal line LSGN is converted into a digital signal.

The ADC 131 converts a change of the voltage into a change of the time with respect to a change of the reference voltage Vslop, and converts the time into a digital value by counting the time in a certain period (clock).

When the analog signal VSL and the reference voltage Vslop intersect each other, an output of the comparator 132 is inverted, an input clock of the counter 133 is stopped, or a clock at which an input is stopped is input to the counter 133, and an A/D conversion is completed.

The column processing section (readout circuit) 130 in the present embodiment performs an A/D conversion process in synchronization with the first clock CLKs of the first frequency f1 previously selected which is supplied from the rate conversion control section 200 so as to operate at a constant timing.

The timing control circuit 150 controls and generates a timing necessary for processes of the pixel array section 110, the row scanning circuit 120, the column processing section 130, the column scanning circuit 140, the output IF circuit 160, and the like.

In the CMOS image sensor 100 of FIG. 3, the pixel array section 110 is controlled in a column unit. For this reason, for example, pixels of t+1 are controlled simultaneously in parallel from 110A-00 to 110A-0t by the column scanning control line 101-0, and are input to the column ADC section through the output signal line LSGN connected to the pixel array section 110.

The column ADC section performs an A/D conversion in a column unit, and transfers data after the A/D conversion to the output IF circuit 160 using the column scanning circuit 140. The output IF circuit 160 formats the data into a form capable of being received by the latter-stage signal processing circuit, and outputs the data.

The embodiment of the present disclosure can be applied to such an image sensor. In addition, the above-mentioned image sensor is an example, and can be applied without being limited to the above-mentioned configuration.

[Rate Conversion Control]

Next, the configuration and the function of the rate conversion control section 200 which performs a rate conversion control in modes such as decimation or addition will be described in detail.

Figure 6:
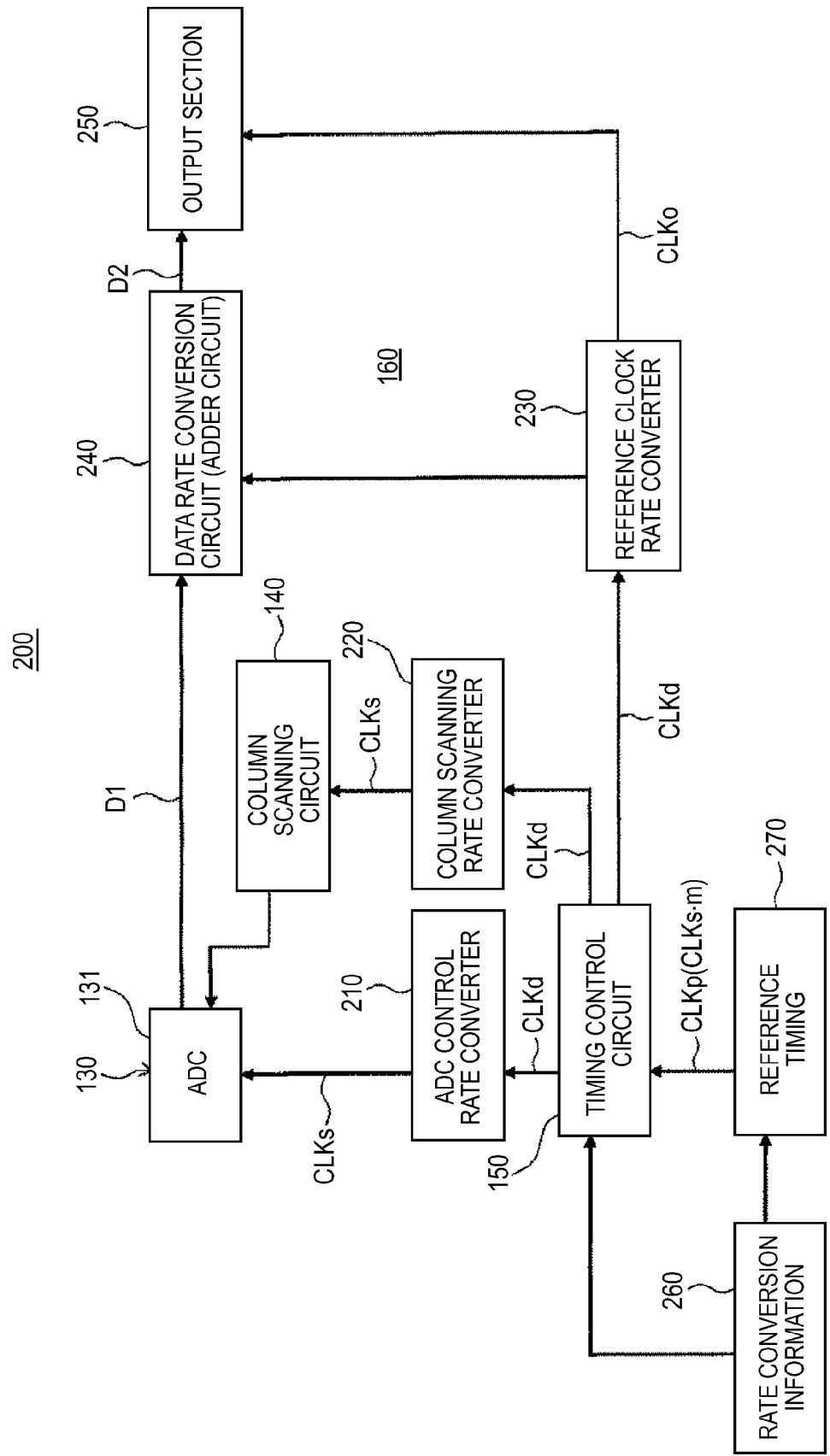
FIG. 6 is a diagram illustrating a configuration example of a rate conversion control section according to the present embodiment.

FIG. 6 is a diagram illustrating a configuration example of the rate conversion control section according to the present embodiment.

Figure 7:
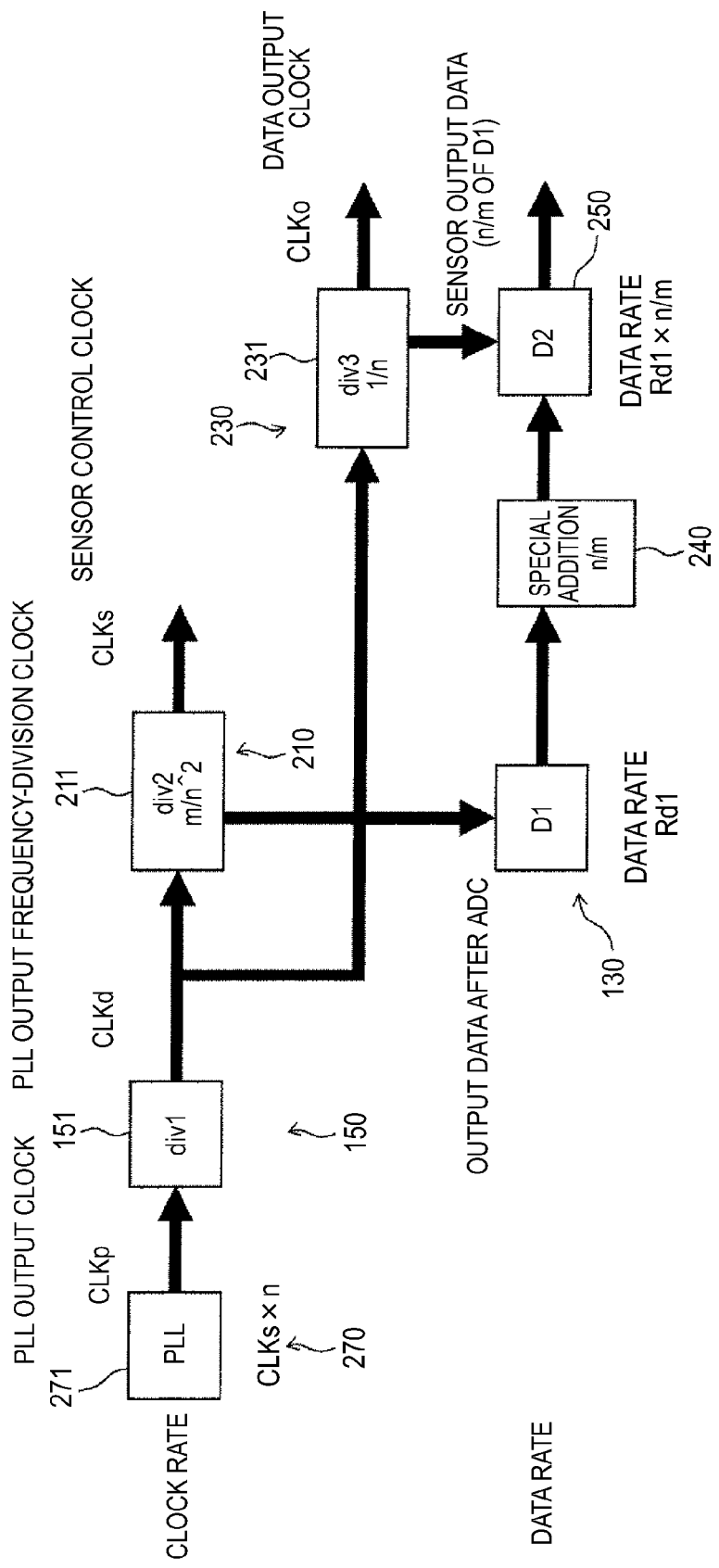
FIG. 7 is a diagram schematically illustrating a clock rate conversion system and a data rate conversion system in the rate conversion control section according to the present embodiment which are divided into systems.

FIG. 7 is a diagram schematically illustrating a clock rate conversion system and a data rate conversion system in the rate conversion control section according to the present embodiment which are divided into systems.

The rate conversion control section 200 includes the column scanning circuit 140, the timing control circuit 150, and the output IF circuit 160 in the configuration of FIG. 3.

The rate conversion control section 200 has a function of performing a rate conversion control of data processed in the column processing section 130, in accordance with rate conversion information such as decimation and addition.

The rate conversion control section 200 of FIG. 6 includes an ADC control rate converter 210 and a column scanning rate converter 220 used as a first rate converter, a reference clock rate converter 230 used as a second rate converter, and a data rate conversion circuit (adder circuit) 240.

The rate conversion control section 200 further includes a data output section 250, a rate conversion information supply section 260, and a reference timing generating section 270.

Among these components, for example, the reference clock rate converter 230, the data rate conversion circuit 240, and the data output section 250 include the output IF circuit 160 of FIG. 3.

In addition, the ADC control rate converter 210 or the column scanning rate converter 220 is disposed within or separately from the timing control circuit 150.

In addition, the rate conversion information supply section 260 or the reference timing generating section 270 are also disposed within or separately from the timing control circuit 150.

The timing control circuit 150 generates the second clock CLKd of the second frequency f2 in accordance with the rate conversion information, such as decimation or addition, supplied from the rate conversion information supply section 260 and the fourth clock CLKp of the fourth frequency f4 from the reference timing generating section 270.

The timing control circuit 150 supplies the generated second clock CLKd to the ADC control rate converter 210, the column scanning rate converter 220, and the reference clock rate converter 230.

The rate conversion information supply section 260 issues a rate conversion command to the timing control circuit 150 and the reference timing generating section 270, on the basis of rate conversion information which is set in a register or the like.

The rate conversion information supply section 260 decodes rate conversion settings in the image sensor as an example, and issues a rate conversion command suitable for each function.

The contents of the rate conversion command are different from each other for each function.

For example, when the rate conversion ratio is n/m, the command becomes reference change information of multiplication setting of a PLL 271 in the reference timing generating section 270, and becomes reference clock control information of the ADC control rate converter 210 and the column scanning rate converter 220 in the timing control circuit 150.

Meanwhile, the contents of the rate conversion command output from the rate conversion information supply section 260 are different from each other depending on a function of a connection destination.

The reference timing generating section 270 generates the fourth clock CLKp of the fourth frequency f4 phase-synchronized with a reference signal in accordance with the rate conversion information which is output by the rate conversion information supply section 260.

The fourth frequency f4 of the fourth clock CLKp is p times the second frequency f2 of the reference clock CLKd which is the second clock, and is (p·n) times the third frequency of the third clock CLKo.

As shown in FIG. 7, the reference timing generating section 270 includes the PLL (phase-locked loop) 271, and the PLL 271 generates the fourth clock CLKp to output the clock to the timing control circuit 150.

As shown in FIG. 7, the timing control circuit 150 includes a first divider 151 (div1).

The first divider 151 frequency-divides the fourth clock CLKp generated by the PLL 171 and generates the reference clock CLKd which is the second clock of the second frequency f2.

The first divider 151 supplies the generated second clock CLKd to the ADC control rate converter 210, the column scanning rate converter 220, and the reference clock rate converter 230.

The ADC control rate converter 210 used as the first rate converter generates the first clock CLKs and supplies the clock to the column processing section 130, on the basis of the reference clock CLKd which is the second clock of the second frequency f2 supplied by the timing control circuit 150.

Thereby, the column processing section 130 receives a supply of the first clock CLKs of the first frequency f1 previously selected, and operates at a constant timing regardless of the data rate conversion ratio.

In the present embodiment, the data rate conversion (change) is realized by the rate conversion (change) of a drive clock and the addition of data, without changing the timing of the ADC control, and without using a buffer. Thereby, the system can be simplified and costs can be considerably reduced. Further, a buffer (line memory) is not necessary, and a control circuit for an ADC parameter change due to a change of the clock rate is not necessary.

As shown in FIG. 7, the ADC control rate converter 210 used as the first rate converter includes a second divider (div2) 211.

The second divider 211 outputs the first clock CLKs of the first frequency f1 (f2·(m/n²)) to the column processing section 130 by multiplying the reference clock CLKd generated in the first divider 151 by (m/n²).

The column scanning rate converter 220 generates the first clock CLKs and supplies the clock to the column scanning circuit 140, on the basis of the reference clock CLKd which is the second clock of the second frequency f2 supplied by the timing control circuit 150.

The column scanning rate converter 220 includes a second divider similar to the ADC control rate converter 210.

The reference clock rate converter 230 used as the second rate converter generates the third clock CLKo of the third frequency f3 which changes depending on the data rate and outputs the clock to the data output section 250, on the basis of the reference clock CLKd which is the second clock of the second frequency f2.

As shown in FIG. 7, the reference clock rate converter 230 used as the second rate converter includes a third divider (div3) 231.

The third divider 231 outputs the third clock CLKo of the third frequency f3 (f2·(1/n)) by multiplying the reference clock CLKd generated in the first divider 151 by (1/n).

An arbitrary data rate can be converted by combining the column scanning rate converter 220 with the reference clock rate converter 230.

The data rate conversion circuit 240 converts a rate of the first data D1 processed in the column processing section 130 through a process including an addition process and an averaging process, and outputs data after the conversion or before the conversion as the second data D2 to the data output section 250.

Figure 8:
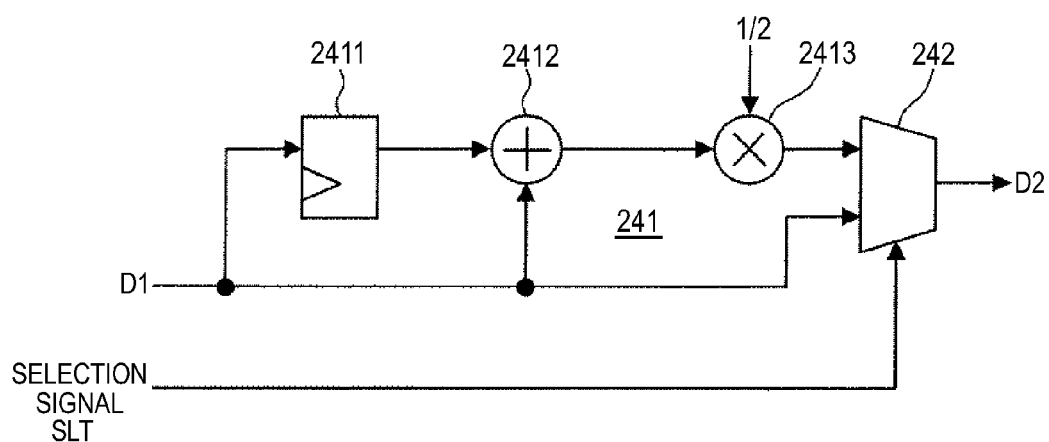
FIG. 8 is a diagram illustrating a configuration example of a data rate conversion circuit according to the present embodiment.

FIG. 8 is a diagram illustrating a configuration example of a data rate conversion circuit according to the present embodiment.

The data rate conversion circuit 240 of FIG. 8 includes a conversion section 241 and a selector 242.

The conversion section 241 adds data of a plurality of (in this example, two) pixels, and outputs the data to the selector 242 by averaging the addition result.

The conversion section 241 of FIG. 8 includes a delay element 2411, an adder 2412, and a multiplier 2413 which are formed by a flip-flop and the like.

In the conversion section 241, the previous data D1 and the currently input data D1 which are delayed by the delay element 2411 are added by the adder 2412, and the addition result is multiplied by coefficient 1/2 by the multiplier 2413. The multiplier 2413 performs an averaging process.

In this example, the number of data to be added is two, and thus the coefficient is 1/2. When the number of data to be added is 3, 4 ..., the coefficient to be multiplied is 1/3, 1/4 ....

The selector 242 selects any one of output data of the conversion section 241 and first data input from the column processing section 130 in response to a selection signal SLT and outputs the selected data as the second data D2.

For example, the selector 242 selects and outputs an output value of the conversion section 241 when the selection signal SLT is in a high level, and the selector selects and outputs the first input data D1 when the selection signal is in a low level.

Various rate conversions (changes) can be made by a combination of the selection of the selector 242.

When the rate conversion ratio is n/m, the number of period of time in which the selector 242 selects the output data of the conversion section 241 is (m−n) every m pieces of data based on the third clock CLKo related to the output rate of the data output section 250.

The data output section 250 outputs the second data D2 which is output by the data rate conversion circuit 240, in synchronization with the third clock CLKo.

Figure 9:
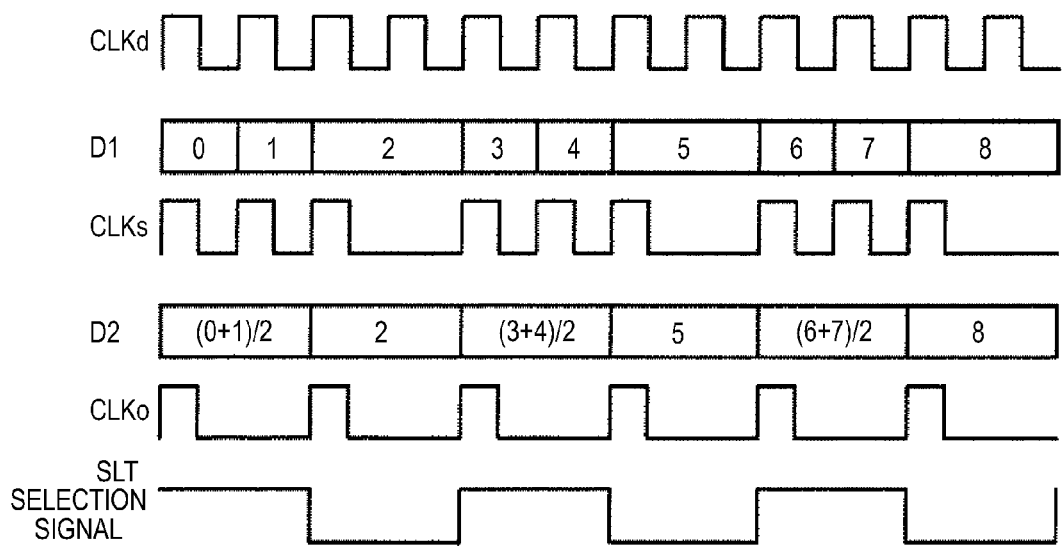
FIG. 9 is a timing diagram indicating relationships between a first clock CLKs, a second clock (reference clock) CLKd, a third clock CLKo, and a selection signal SLT in a case where the rate conversion ratio is [2(=n)/3(=m)], and first data D1 and second data D2.

FIG. 9 is a timing diagram indicating relationships between the first clock CLKs, the second clock (reference clock) CLKd, the third clock CLKo, and the selection signal SLT in a case where the rate conversion ratio is [2(=n)/3(=m)], and the first data D1 and the second data D2.

An application example in a case where the rate conversion ratio is 2/3 addition will be described later in detail.

As shown in FIG. 7, when the data rate of the first data D1 processed by the column processing section 130 is Rd1, a data rate Rd2 of the second data D2 output from the data output section 250 is Rd1·(n/m).

In the rate conversion control section 200 of clocks of FIG. 7 and the data rate conversion system as described above, it is necessary to make the first clock CLKs which is a sensor control clock constant, and thus the frequency of the PLL is controlled along with that.

The rate conversion control section 200 can adjust the PLL 271, the first divider (div1) 151, and the second divider (div2) 211, depending on the decimation ratio in order to make the first clock CLKs constant.

In addition, the rate conversion control section 200 can adjust the PLL 271 and the third divider (div3) 231 in order to obtain a desired output data rate.

In the present embodiment, when the rate conversion ratio is n/m, the first frequency f1 of the first clock CLKs which is a sensor control clock is set to a frequency obtained by multiplying the second frequency f2 of the reference clock CLKd by $(m/n^2)$.

The second frequency f2 of the reference clock CLKd is set to a frequency obtained by frequency-dividing an output of the PLL 271.

The third frequency f3 of the third clock CLKo which is a data output clock is set to a frequency obtained by multiplying the second frequency f2 of the reference clock CLKd by (1/n).

In addition, the fourth frequency f4 of the fourth clock CLKp of the PLL 271 is set to a frequency obtained by multiplying the third frequency f3 of the third clock CLKo by the number of data bits.

For example, when the output data is 10 bits, the relationship of CLKp(f4)=CLKo(f3)×10 is satisfied.

In other words, when the rate conversion ratio is n/m, the rate conversion control section 200 sets the frequency f2 of the reference clock CLKd which is the second clock to f1/(m/$n^2$), and sets the third frequency f3 of the third clock CLKo to f2/n.

[Application Example of Horizontal 2/3 and 3/5 Decimation]

Hereinafter, a description will be made of application examples of horizontal 2/3 decimation of n=2 and m=3, and horizontal 3/5 decimation of n=3 and m=5, as a rate conversion process.

[Horizontal 2/3 Decimation]

Figure 10:
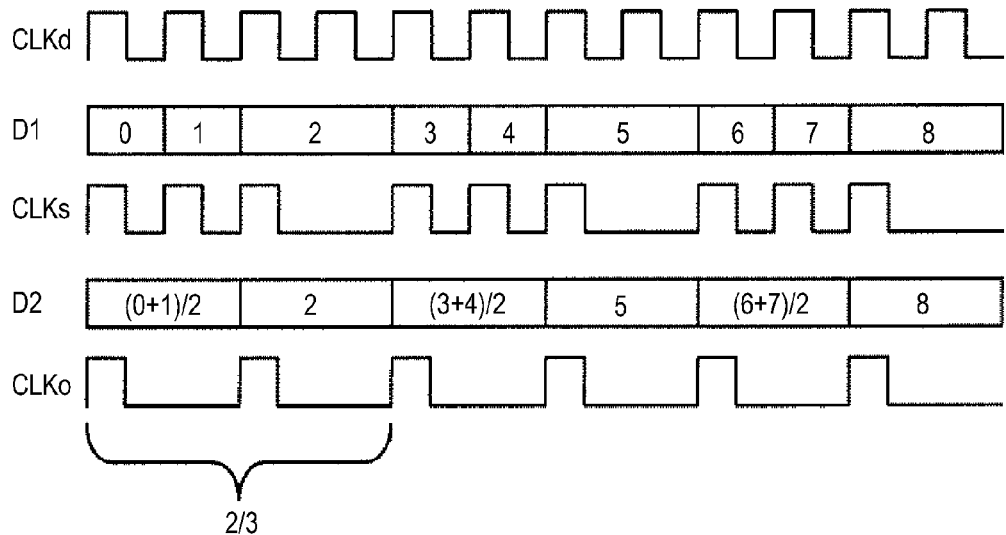
FIG. 10 is a timing diagram indicating relationships between the first clock CLKs, the second clock (reference clock) CLKd, and the third clock CLKo in a case of horizontal 2/3 decimation, and the first data D1 and the second data D2.

FIG. 10 is a timing diagram indicating relationships between the first clock CLKs, the second clock (reference clock) CLKd, and the third clock CLKo in a case of horizontal 2/3 decimation, and the first data D1 and the second data D2.

In the following, an example of a clock frequency operation associated with the horizontal 2/3 decimation process is expressed as Expression 1 to Expression 5.

In the case of CLKs=2/3 of 81 MHz (output data 10 bits)

$$CLKd = CLKs/(m/n^2) \qquad \text{Expression 1}$$
$$= 81/(3/2^2) = 108 \text{ MHz}$$

$$PLL = CLKd \times p \qquad \text{Expression 2}$$
$$= 108 \times 5 = 540 \text{ MHz}$$

$$CLKo = CLKd \times n \qquad \text{Expression 3}$$
$$= 108/2 = 54 \text{ MHz}$$

$$PLL = CLKo \times 10 \Rightarrow OK! \qquad \text{Expression 4}$$

In the example of the Expressions, a case where the output data is 10 bits when the first frequency f1 of the first clock CLKs is 81 MHz is shown as an example.

In the present embodiment, since the control timing is not changed due to a Time to Digital ADC, it is necessary that the first clock CLKs for controlling the ADC is set to the constant frequency f1, as a constraint condition, regardless of the data rate. In this example, the first clock is 81 MHz.

[Calculation Expression]

In order to realize a 2/3 rate conversion, two pieces of data after the A/D conversion of the column processing section 130 is operated to set them to one data, and the rate of data is converted to 2/3 by using the next data as it is.

For this reason, in order to uniform the third clock CLKo indicating the timing after the data rate conversion, it is necessary to set the first clock CLKs to the timing of 3/4.

Therefore, as shown in Expression 1, the reference frequency of the reference clock CLKd is set to be 4/3 times the frequency of the first clock CLKs. In this example, the frequency is set to 81×(4/3)=108 MHz.

The output of the PLL 271 is preferably set to a multiple of the data width which is output in synchronization with the third clock CLKo. Circuit costs can be reduced by setting the third clock CLKo to $1/2^x$ of the reference clock CLKd.

From the above-mentioned reason, when 10 bit data is handled, the relationship of p·x·n=10 is established, and p and n are determined as in Expression 2 and Expression 3, depending on circuit costs.

In this example, the fourth frequency f4 of the fourth clock CLKp which is output from the PLL 271 is set to be 108×5=540 MHz.

The third frequency f3 of the third clock CLKo is set to be 108/2=54 MHz.

As shown in Expression 4, the fourth frequency f4 (540 MHz) of the fourth clock CLKp which is output from the PLL 271 is set to be 10 times the third frequency f3 (=54 MHz) of the third clock CLKo, corresponding to the output data of 10 bits (OK).

[Horizontal 3/4 Decimation]

Figure 11:
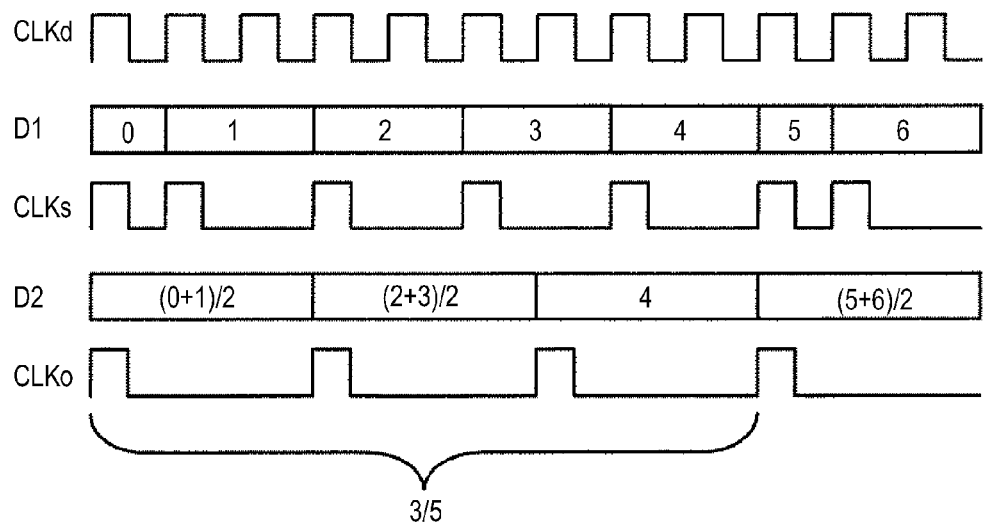
FIG. 11 is a timing diagram indicating relationships between the first clock CLKs, the second clock (reference clock) CLKd, and the third clock CLKo in a case of horizontal 3/5 decimation, and the first data D1 and the second data D2.

FIG. 11 is a timing diagram indicating relationships between the first clock CLKs, the second clock (reference clock) CLKd, and the third clock CLKo in a case of horizontal 3/5 decimation, and the first data D1 and the second data D2.

In the following, an example of a clock frequency operation associated with the horizontal 3/5 decimation process is expressed as Expression 5 to Expression 8.

In the case of CLKs=3/5 of 81 MHz (output data 10 bits)

$$CLKd = CLKs/(m/n^2) \qquad \text{Expression 5}$$
$$= 81/(5/3^2) = 145.8 \text{ Hz}$$

$$PLL = 145.8 \times 10/3 = 486 \text{ MHz} \qquad \text{Expression 6}$$

$$CLKo = CLKd \times n \qquad \text{Expression 7}$$
$$= 145.8/3 = 48.6 \text{ MHz}$$

$$PLL = CLKo \times 10 = 10 \Rightarrow OK! \qquad \text{Expression 8}$$

In the example of the Expressions, a case where the output data is 10 bits when the first frequency f1 of the first clock CLKs is 81 MHz is also shown as an example.

In the present embodiment, since the control timing is not changed due to a Time to Digital ADC, it is necessary that the first clock CLKs for controlling the ADC is set to the constant frequency f1, as a constraint condition, regardless of the data rate. In this example, the first clock is 81 MHz.

[Calculation Expression]

In order to realize a 3/5 rate conversion, plural pieces of data after the A/D conversion of the column processing section 130 is operated to set them to one data, and the rate of data is converted to 3/5 by using the next data as it is.

For this reason, in order to uniform the third clock CLKo indicating the timing after the data rate conversion, it is necessary to set the first clock CLKs to the timing of 3/4.

Therefore, as shown in Expression 1, the reference frequency of the reference clock CLKd is set to be 9/5 times the frequency of the first clock CLKs. In this example, the frequency is set to 81×(9/5)=145.8 MHz.

The output of the PLL 271 is preferably set to a multiple of the data width which is output in synchronization with the third clock CLKo. Circuit costs can be reduced by setting the third clock CLKo to $1/3^x$ of the reference clock CLKd.

From the above-mentioned reason, when 10 bit data is handled, the relationship of p·x·n=10 is established, and p and n are determined as in Expression 6 and Expression 7, depending on circuit costs.

In this example, the fourth frequency f4 of the fourth clock CLKp which is output from the PLL 271 is set to be 145.8×(10/3)=486 MHz.

The third frequency f3 of the third clock CLKo is set to be 145.8/3=48.6 MHz.

As shown in Expression 4, the fourth frequency f4 (486 MHz) of the fourth clock CLKp which is output from the PLL 271 is set to be 10 times the third frequency f3 (=48.6 MHz) of the third clock CLKo, corresponding to the output data of 10 bits (OK).

The rate conversion control section 200 in the present embodiment supplies the first clock CLKs of the first frequency f1, previously selected, to the column processing section 130 so that the column processing section (readout circuit) 130 operates at a constant timing.

The rate conversion control section 200 performs a rate conversion control of data processed in the column processing section 130, in accordance with rate conversion information.

The rate conversion control section 200 includes the ADC control rate converter 210 that generates the first clock CLKs and supplies the clock to the column processing section 130, on the basis of the reference clock CLKd which is the second clock of the second frequency f2.

The rate conversion control section 200 includes the reference clock rate converter 230 that generates the third clock CLKo of the third frequency f3 which changes depending on the data rate, on the basis of the reference clock CLKd of the second frequency f2.

The rate conversion control section 200 includes the data rate conversion circuit 240 that converts a rate of data processed in the column processing section 130 and outputs data after the conversion or before the conversion as second data through a process including an addition process.

The rate conversion control section 200 includes the data output section 250 that outputs the second data D2 which is output by the data rate conversion circuit 240, in synchronization with the third clock CLKo.

Therefore, according to the present embodiment, it is possible to realize the data rate conversion (change) by the rate conversion (change) of a drive clock and the addition of data, without changing the timing of the ADC control, and without using a buffer.

According to the present embodiment, the system can be simplified and costs can be considerably reduced. Further, a buffer (line memory) is not necessary, and a control circuit for an ADC parameter change due to a change of the clock rate is not necessary.

The solid-state imaging device has an effect as mentioned above can be applied as an imaging device of a digital camera or a video camera.

<2. Second Embodiment>

Figure 12:
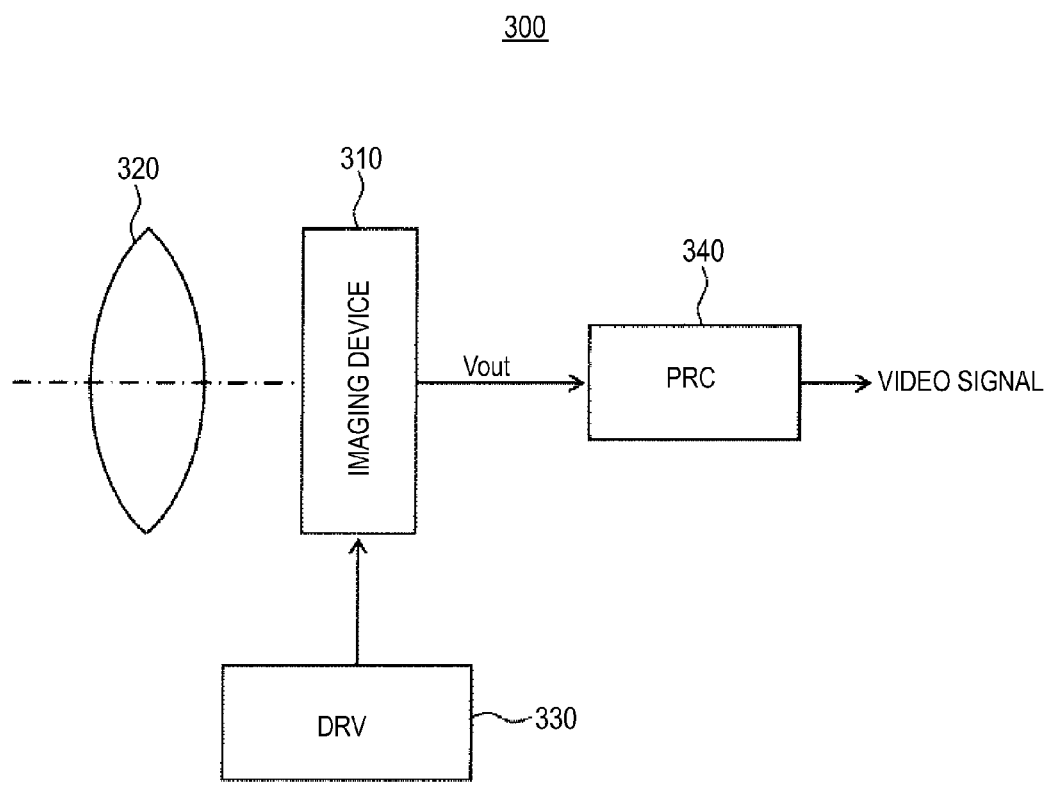
FIG. 12 is a diagram illustrating an example of a configuration of a camera system to which the solid-state imaging device according to a second embodiment of the present disclosure is applied.

FIG. 12 is a diagram illustrating an example of a configuration of a camera system to which a solid-state imaging device according to a second embodiment of the present disclosure is applied.

As shown in FIG. 12, a camera system 300 includes an imaging device 310 to which the CMOS image sensor (solid-state imaging device) 100 according to the present embodiment is capable of being applied.

Further, the camera system 300 includes an optical system that guides incident light (forms a subject image) to a pixel region of the imaging device 310, for example, a lens 320 that forms the incident light (image light) on the imaging surface.

The camera system 300 includes a driving circuit (DRV) 330 that drives the imaging device 310, and a signal processing circuit (PRC) 340 that processes an output signal of the imaging device 310.

The driving circuit 330 includes a timing generator (not shown) that generates various types of timing signals including a start pulse or a clock pulse for driving a circuit within the imaging device 310, and drives the imaging device 310 with a predetermined timing signal.

In addition, the signal processing circuit 340 performs predetermined signal processing on the output signal of the imaging device 310.

The image signal processed in the signal processing circuit 340 is recorded in, for example, a recording medium such as a memory. Image information recorded in the recording medium is hard-copied by a printer or the like. In addition, the image signal processed in the signal processing circuit 340 is displayed as a moving image on a monitor such as a liquid crystal display.

As mentioned above, in an imaging apparatus such a digital still camera, a camera with a high degree of precision and low power consumption can be realized as the imaging device 310 by mounting the above-mentioned CMOS image sensor (solid-state imaging device) 100.

The present disclosure can be implemented as the following configurations.

(1) A solid-state imaging device including:

a pixel section in which a plurality of pixels including a photoelectric conversion element are arranged in a matrix;

a pixel driving section that drives the pixels in a row unit so as to read out a pixel signal from the pixel section;

a column processing section that performs a column process, synchronized with a first clock of a first frequency previously selected, on the pixel signal read out by driving of the pixel driving section; and a rate conversion control section that performs a rate conversion control of data processed in the column processing section in accordance with rate conversion information, wherein the rate conversion control section includes a first rate converter that generates the first clock and supplies the first clock to the column processing section, on the basis of a reference clock which is a second clock of a second frequency, a second rate converter that generates a third clock of a third frequency which changes depending on a data rate, on the basis of the reference clock which is the second clock of the second frequency, a data rate conversion section that converts a rate of data processed in the column processing section through a process including an addition process, and outputs data after the conversion or before the conversion as second data, and a data output section that outputs the second data which is output from the data rate conversion section, in synchronization with the third clock.

(2) The solid-state imaging device according to the above (1), wherein when a rate conversion ratio is n/m, the first frequency of the first clock is f1, the second frequency of the second clock which is a reference clock is f2, and the third frequency of the third clock is f3, the rate conversion control section sets the frequency f2 of the second clock which is the reference clock to f1/(m/n$^2$), and sets the third frequency f3 of the third clock to f2/n.

(3) The solid-state imaging device according to the above (2), wherein the rate conversion control section include a phase-locked loop that outputs a fourth clock of a fourth frequency which is phase-synchronized with a reference signal, and a first divider that frequency-divides the fourth clock which is output from the phase-locked loop and generates the reference clock of the second frequency f2, and the fourth frequency f4 of the fourth clock is p times the second frequency f2 of the reference clock, and is p·n times the third frequency f3 of the third clock.

(4) The solid-state imaging device according to the above (3), wherein in the rate conversion control section, the first rate converter includes a second divider that outputs the first clock of the first frequency f1 (f2·(m/n$^2$)) by multiplying the reference clock generated in the first divider by (m/n$^2$), and the second rate converter includes a third divider that outputs the third clock of the third frequency f3 (f2·(1/n)) by multiplying the reference clock generated in the first divider by (1/n).

(5) The solid-state imaging device according to according to any one of the above (2) to (4), wherein when a data rate of first data processed in the column processing section is Rd1, a data rate Rd2 of the second data which is output from the data output section is Rd1·(n/m).

(6) The solid-state imaging device according to according to any one of the above (1) to (5), wherein the data rate conversion section includes a conversion section that adds data of a plurality of pixel portions and averages an addition result, and a selector that selects any one of output data of the conversion section and first data input from the column processing section in response to a selection signal and outputs the selected data as the second data.

(7) The solid-state imaging device according to the above (6), wherein when the rate conversion ratio is n/m, the number of period of time in which the selector selects the output data of the conversion section is (m−n) every m pieces of data based on the third clock related to an output rate of the data output section.

(8) A method of driving a solid-state imaging device, including:

reading out a pixel signal from a pixel section in which a plurality of pixels including a photoelectric conversion element are arranged in a matrix;

performing a column process, synchronized with a first clock of a first frequency previously selected, on the pixel signal read out by the reading out; and performing a rate conversion control of data processed in the performing of a column process, in accordance with rate conversion information, wherein the performing a rate conversion control includes generating the first clock and supplying the generated first clock to the performing a column process, on the basis of a reference clock which is a second clock of a second frequency, generating a third clock of a third frequency which changes depending on a data rate, on the basis of the reference clock which is the second clock of the second frequency, converting a rate of data processed in the performing of a column process through a process including an addition process, and outputting data after the conversion or before the conversion as second data, and outputting the second data which is converted by the converting a rate of data, in synchronization with the third clock.

(9) The method of driving a solid-state imaging device according to the above (8), wherein when a rate conversion ratio is n/m, the first frequency of the first clock is f1, the second frequency of the reference clock which is the second clock is f2, and the third frequency of the third clock is f3, the frequency f2 of the reference clock which is the second clock is set to f1/(m/n$^2$), and the third frequency f3 of the third clock is set to f2/n.

(10) The method of driving a solid-state imaging device according to the above (9), wherein the performing of a rate conversion control includes frequency-dividing a fourth clock of a fourth frequency phase-synchronized with a reference signal and generating the reference clock of the second frequency f2, and the fourth frequency f4 of the fourth clock is p times the second frequency f2 of the reference clock, and is p·n times the third frequency f3 of the third clock.

(11) The method of driving a solid-state imaging device according to the above (10), wherein the performing of a rate conversion control includes outputting the first clock of the first frequency f1 (f2·(m/n$^2$)) by multiplying the reference clock by (m/n$^2$), in the generating of the first clock, and outputting the third clock of the third frequency f3 (f2·(1/n)) by multiplying the reference clock by (1/n), in the generating of a third clock.

(12) The method of driving a solid-state imaging device according to according to any one of the above (9) to (11), wherein when a data rate of first data processed in the column processing section is Rd1, a data rate Rd2 of second data output from the data output section is Rd1·(n/m).

(13) The method of driving a solid-state imaging device according to according to any one of the above (8) to (12), wherein the converting of a rate of data includes adding data of a plurality of pixel portions and averaging an addition result, and selecting any one of output data in the adding of data and first data in performing of a column process in response to a selection signal and outputting the selected data as the second data.

(14) The method of driving a solid-state imaging device according to the above (13), wherein when a rate conversion ratio is n/m, the number of period of time in which the selector selects the output data in the adding of data is (m−n) every m pieces of data based on the third clock related to an output rate in the outputting of the second data.

(15) A camera system including:

a solid-state imaging device;

an optical system that forms a subject image in the solid-state imaging device; and a signal processing circuit that processes an output image signal of the solid-state imaging device, wherein the solid-state imaging device includes a pixel section in which a plurality of pixels including a photoelectric conversion element are arranged in a matrix;

a pixel driving section that drives the pixels in a row unit so as to read out a pixel signal from the pixel section;

a column processing section that performs a column process, synchronized with a first clock of a first frequency previously selected, on the pixel signal read out by driving of the pixel driving section; and a rate conversion control section that performs a rate conversion control of data processed in the column processing section in accordance with rate conversion information, and the rate conversion control section includes a first rate converter that generates the first clock and supplies the first clock to the column processing section, on the basis of a reference clock which is a second clock of a second frequency, a second rate converter that generates a third clock of a third frequency which changes depending on a data rate, on the basis of the reference clock which is the second clock of the second frequency, a data rate conversion section that converts a rate of data processed in the column processing section through a process including an addition process, and outputs data after the conversion or before the conversion as second data, and a data output section that outputs the second data which is output from the data rate conversion section, in synchronization with the third clock.

The present disclosure contains subject matter related to that disclosed in Japanese Priority Patent Application JP 2011-120083 filed in the Japan Patent Office on May 30, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel section in which a plurality of pixels including a photoelectric conversion element are arranged in a matrix;
a pixel driving section that drives the pixels in a row unit so as to read out a pixel signal from the pixel section;
a column processing section that performs a column process, synchronized with a first clock of a first frequency previously selected, on the pixel signal read out by driving of the pixel driving section; and
a rate conversion control section that performs a rate conversion control of data processed in the column processing section in accordance with rate conversion information,
wherein the rate conversion control section includes
a first rate converter that generates the first clock and supplies the first clock to the column processing section, on the basis of a reference clock which is a second clock of a second frequency,
a second rate converter that generates a third clock of a third frequency which changes depending on a data rate, on the basis of the reference clock which is the second clock of the second frequency,
a data rate conversion section that converts a rate of data processed in the column processing section through a process including an addition process, and outputs data after the conversion or before the conversion as second data, and
a data output section that outputs the second data which is output from the data rate conversion section, in synchronization with the third clock.

2. The solid-state imaging device according to claim 1, wherein when a rate conversion ratio is n/m, the first frequency of the first clock is f1, the second frequency of the second clock which is a reference clock is f2, and the third frequency of the third clock is f3, the rate conversion control section sets the frequency f2 of the second clock which is the reference clock to $f1/(m/n^2)$, and sets the third frequency f3 of the third clock to f2/n.

3. The solid-state imaging device according to claim 2, wherein the rate conversion control section includes
a phase-locked loop that outputs a fourth clock of a fourth frequency which is phase-synchronized with a reference signal, and
a first divider that frequency-divides the fourth clock which is output from the phase-locked loop and generates the reference clock of the second frequency f2, and
the fourth frequency f4 of the fourth clock is p times the second frequency f2 of the reference clock, and is p·n times the third frequency f3 of the third clock.

4. The solid-state imaging device according to claim 3, wherein in the rate conversion control section, the first rate converter includes a second divider that outputs the first clock of the first frequency f1 $(f2 \cdot (m/n^2))$ by multiplying the reference clock generated in the first divider by $(m/n^2)$, and
the second rate converter includes a third divider that outputs the third clock of the third frequency f3 $(f2 \cdot (1/n))$ by multiplying the reference clock generated in the first divider by $(1/n)$.

5. The solid-state imaging device according to claim 2, wherein when a data rate of first data processed in the column processing section is Rd1, a data rate Rd2 of the second data which is output from the data output section is $Rd1 \cdot (n/m)$.

6. The solid-state imaging device according to claim 1, wherein the data rate conversion section includes
a conversion section that adds data of a plurality of pixel portions and averages an addition result, and
a selector that selects any one of output data of the conversion section and first data input from the column processing section in response to a selection signal and outputs the selected data as the second data.

7. The solid-state imaging device according to claim 6, wherein when the rate conversion ratio is n/m, the number of period of time in which the selector selects the output data of the conversion section is (m−n) every m pieces of data based on the third clock related to an output rate of the data output section.

8. A method of driving a solid-state imaging device, comprising:
reading out a pixel signal from a pixel section in which a plurality of pixels including a photoelectric conversion element are arranged in a matrix;
performing a column process, synchronized with a first clock of a first frequency previously selected, on the pixel signal read out by the reading out; and
performing a rate conversion control of data processed in the performing of a column process, in accordance with rate conversion information,
wherein the performing a rate conversion control includes
generating the first clock and supplying the generated first clock to the performing a column process, on the basis of a reference clock which is a second clock of a second frequency,
generating a third clock of a third frequency which changes depending on a data rate, on the basis of the reference clock which is the second clock of the second frequency,
converting a rate of data processed in the performing of a column process through a process including an addition process, and outputting data after the conversion or before the conversion as second data, and
outputting the second data which is converted by the converting a rate of data, in synchronization with the third clock.

9. The method of driving a solid-state imaging device according to claim 8, wherein when a rate conversion ratio is n/m, the first frequency of the first clock is f1, the second frequency of the reference clock which is the second clock is f2, and the third frequency of the third clock is f3, the frequency f2 of the reference clock which is the second clock is set to $f1/(m/n^2)$, and the third frequency f3 of the third clock is set to f2/n.

10. The method of driving a solid-state imaging device according to claim 9, wherein the performing of a rate conversion control includes frequency-dividing a fourth clock of a fourth frequency phase-synchronized with a reference signal and generating the reference clock of the second frequency f2, and the fourth frequency f4 of the fourth clock is p times the second frequency f2 of the reference clock, and is p·n times the third frequency f3 of the third clock.

11. The method of driving a solid-state imaging device according to claim 10, wherein the performing of a rate conversion control includes outputting the first clock of the first frequency f1 ($f2·(m/n^2)$) by multiplying the reference clock by ($m/n^2$), in the generating of the first clock, and outputting the third clock of the third frequency f3 (f2·(1/n)) by multiplying the reference clock by (1/n), in the generating of a third clock.

12. The method of driving a solid-state imaging device according to claim 9, wherein when a data rate of first data processed in the column processing section is Rd1, a data rate Rd2 of second data output from the data output section is Rd1·(n/m).

13. The method of driving a solid-state imaging device according to claim 8, wherein the converting of a rate of data includes adding data of a plurality of pixel portions and averaging an addition result, and selecting any one of output data in the adding of data and first data in performing of a column process in response to a selection signal and outputting the selected data as the second data.

14. The method of driving a solid-state imaging device according to claim 13, wherein when a rate conversion ratio is n/m, the number of period of time in which the selector selects the output data in the adding of data is (m−n) every m pieces of data based on the third clock related to an output rate in the outputting of the second data.

15. A camera system comprising:

a solid-state imaging device;

an optical system that forms a subject image in the solid-state imaging device; and a signal processing circuit that processes an output image signal of the solid-state imaging device, wherein the solid-state imaging device includes a pixel section in which a plurality of pixels including a photoelectric conversion element are arranged in a matrix;

a pixel driving section that drives the pixels in a row unit so as to read out a pixel signal from the pixel section;

a column processing section that performs a column process, synchronized with a first clock of a first frequency previously selected, on the pixel signal read out by driving of the pixel driving section; and a rate conversion control section that performs a rate conversion control of data processed in the column processing section in accordance with rate conversion information, and the rate conversion control section includes a first rate converter that generates the first clock and supplies the first clock to the column processing section, on the basis of a reference clock which is a second clock of a second frequency, a second rate converter that generates a third clock of a third frequency which changes depending on a data rate, on the basis of the reference clock which is the second clock of the second frequency, a data rate conversion section that converts a rate of data processed in the column processing section through a process including an addition process, and outputs data after the conversion or before the conversion as second data, and a data output section that outputs the second data which is output from the data rate conversion section, in synchronization with the third clock.

* * * * *